US012193042B2

(12) United States Patent
Ibrahim et al.

(10) Patent No.: US 12,193,042 B2
(45) Date of Patent: Jan. 7, 2025

(54) PROCEDURE FOR COMBINING HD/FD CSI IN ONE REPORT ON PUSCH/PUCCH TRANSMISSIONS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 17/513,604

(22) Filed: Oct. 28, 2021

(65) Prior Publication Data

US 2023/0135716 A1 May 4, 2023

(51) Int. Cl.
| | |
|---|---|
| *H04W 72/542* | (2023.01) |
| *H04L 1/1812* | (2023.01) |
| *H04L 5/00* | (2006.01) |
| *H04L 5/14* | (2006.01) |
| *H04W 72/21* | (2023.01) |
| *H04W 72/56* | (2023.01) |

(52) U.S. Cl.
CPC ......... *H04W 72/542* (2023.01); *H04L 1/1812* (2013.01); *H04L 5/0051* (2013.01); *H04L 5/14* (2013.01); *H04W 72/21* (2023.01); *H04W 72/56* (2023.01)

(58) Field of Classification Search
CPC ... H04W 72/542; H04W 72/56; H04W 72/21; H04L 1/1812; H04L 5/0051; H04L 5/14
USPC .......................................................... 370/329
See application file for complete search history.

(56) References Cited

U.S. PATENT DOCUMENTS

| | | | |
|---|---|---|---|
| 2014/0269454 A1* | 9/2014 | Papasakellariou | H04W 52/34 370/280 |
| 2017/0054544 A1* | 2/2017 | Kazmi | H04L 5/14 |

* cited by examiner

*Primary Examiner* — Chi Tang P Cheng
(74) *Attorney, Agent, or Firm* — Arent Fox, LLP

(57) ABSTRACT

A user equipment may be configured to implement a procedure for combining half-duplex and full-duplex channel state information (CSI) into a single report. In some aspects, the user equipment may receive uplink control information configuration information including one or more parameters for multiplexing half-duplex (HD) channel state information (CSI) and full-duplex (FD) CSI as a combined CSI report, and receive a first reference signal associated with a HD mode and a second reference signal associated with a FD mode. Further, the user equipment may transmit, to a base station, the combined CSI report based on the one or more parameters, the first reference signal, and the second reference signal.

30 Claims, 8 Drawing Sheets

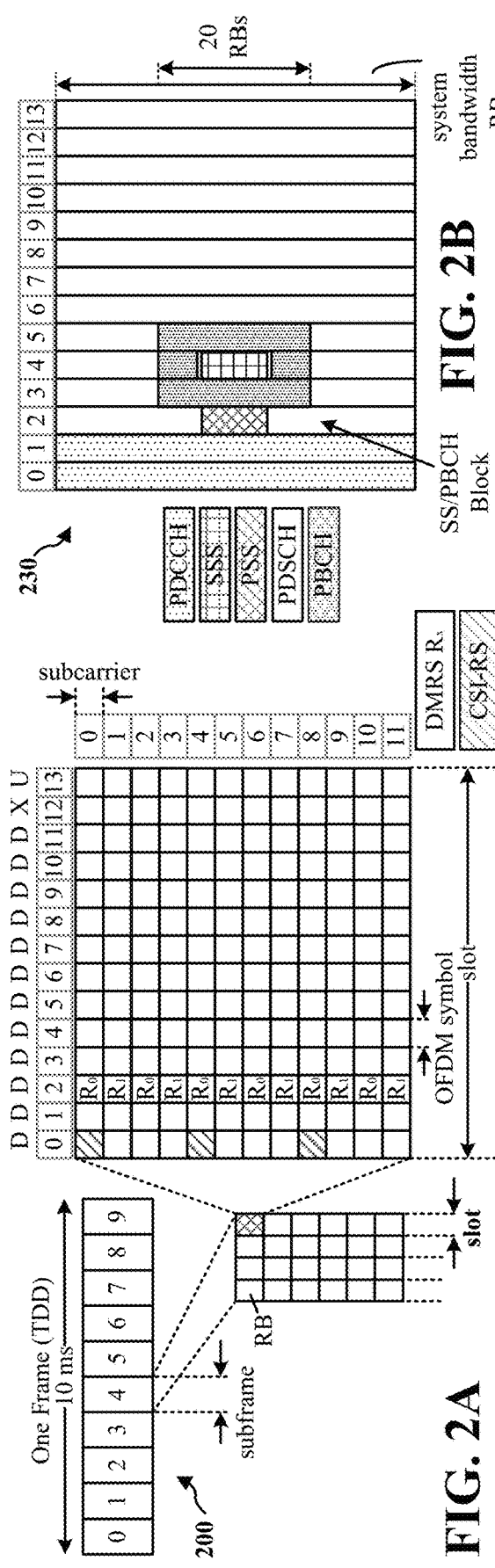
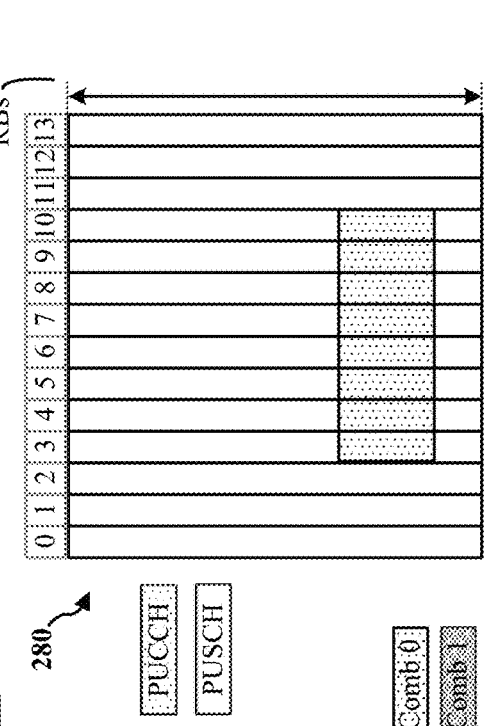
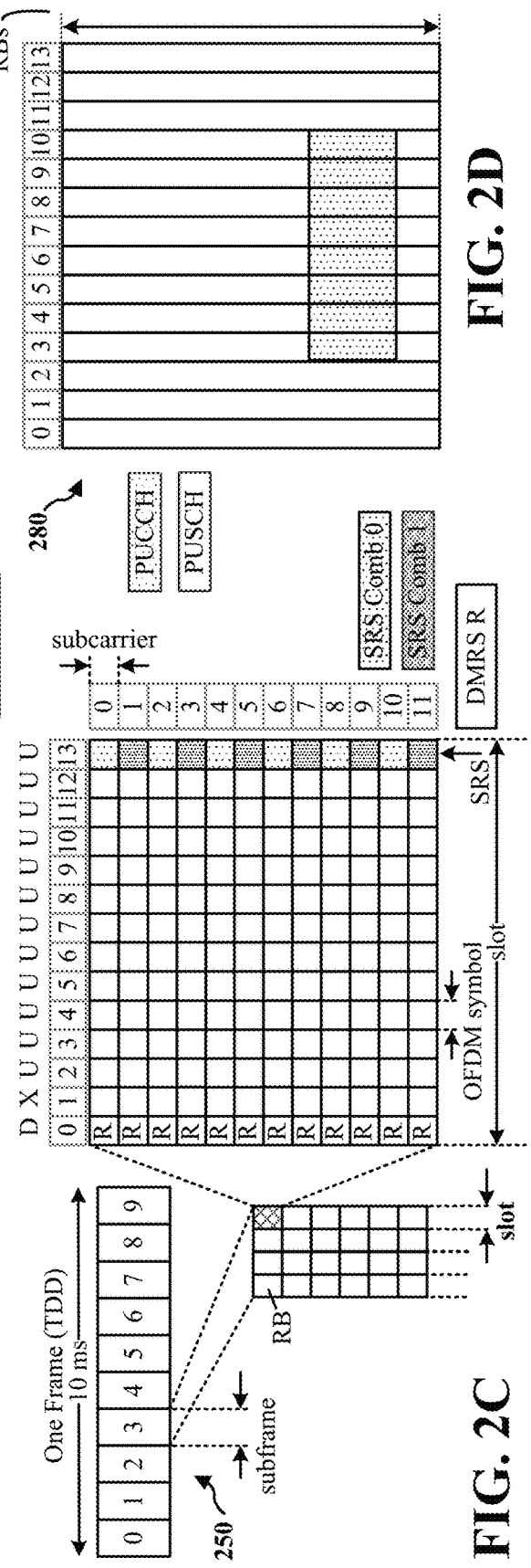

700

```
┌─────────────────────────────────────────────────────────────────────────┐
│ Generating uplink control information (UCI) configuration information    │
│ for a user equipment, the UCI configuration information including one   │
│ or more parameters for configuring a UE to multiplex half-duplex (HD)   │
│ channel state information (CSI) and full-duplex (FD) CSI as a combined  │
│ CSI report                                                               │
│ 710                                                                      │
└─────────────────────────────────────────────────────────────────────────┘
                                    │
                                    ▼
┌─────────────────────────────────────────────────────────────────────────┐
│ Transmitting the UCI configuration information to the UE                 │
│ 720                                                                      │
└─────────────────────────────────────────────────────────────────────────┘
                                    │
                                    ▼
┌─────────────────────────────────────────────────────────────────────────┐
│ Transmitting, to the UE, a first reference signal associated with a HD  │
│ mode and a second reference signal associated with a FD mode            │
│ 730                                                                      │
└─────────────────────────────────────────────────────────────────────────┘
                                    │
                                    ▼
┌─────────────────────────────────────────────────────────────────────────┐
│ Receiving, from the UE, the combined CSI report based on the one or     │
│ more parameters, the first reference signal, and the second reference   │
│ signal                                                                   │
│ 740                                                                      │
└─────────────────────────────────────────────────────────────────────────┘
```

FIG. 7

PROCEDURE FOR COMBINING HD/FD CSI IN ONE REPORT ON PUSCH/PUCCH TRANSMISSIONS

BACKGROUND

Technical Field

The present disclosure relates generally to wireless communication, and more particularly, implementing a procedure for combining half-duplex (HD) and full-duplex (FD) channel state information (CSI) into a single report on physical uplink control channel (PUCCH) and physical uplink shared channel (PUSCH) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving uplink control information (UCI) configuration information from a base station, the UCI configuration information including one or more parameters for multiplexing half-duplex (HD) channel state information (CSI) and full-duplex (FD) CSI as a combined CSI report; receiving, from the base station, a first reference signal associated with a HD mode; receiving, from the base station, a second reference signal associated with a FD mode; and transmitting, to the base station, the combined CSI report based on the one or more parameters, the first reference signal, and the second reference signal.

The disclosure also provides an apparatus (e.g., a UE) including a memory storing computer-executable instructions and at least one processor configured to execute the computer-executable instructions to receive uplink control information (UCI) configuration information from a base station, the UCI configuration information including one or more parameters for multiplexing half-duplex (HD) channel state information (CSI) and full-duplex (FD) CSI as a combined CSI report; receive, from the base station, a first reference signal associated with a HD mode; receive, from the base station, a second reference signal associated with a FD mode; and transmit, to the base station, the combined CSI report based on the one or more parameters, the first reference signal, and the second reference signal. In addition, the disclosure also provides an apparatus including means for performing the above method, and a non-transitory computer-readable medium storing computer-executable instructions for performing the above method.

An example implementation includes a method of wireless communication at a base station comprising generating uplink control information (UCI) configuration information for a user equipment, the UCI configuration information including one or more parameters for configuring a UE to multiplex half-duplex (HD) channel state information (CSI) and full-duplex (FD) CSI as a combined CSI report; transmitting the UCI configuration to the UE; transmitting, to the UE, a first reference signal associated with a HD mode and a second reference signal associated with a FD mode; and receiving, from the UE, the combined CSI report based on the one or more parameters, the first reference signal, and the second reference signal.

The disclosure also provides an apparatus (e.g., a base station) including a memory storing computer-executable instructions and at least one processor configured to execute the computer-executable instructions to generate uplink control information (UCI) configuration information for a user equipment, the UCI configuration information including one or more parameters for configuring a UE to multiplex half-duplex (HD) channel state information (CSI) and full-duplex (FD) CSI as a combined CSI report; transmit the UCI configuration information to the UE; transmit, to the UE, a first reference signal associated with a HD mode and a second reference signal associated with a FD mode; and receive, from the UE, the combined CSI report based on the one or more parameters, the first reference signal, and the second reference signal. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

FIG. 7 is a flowchart of an example method of implementing a procedure for combining half-duplex and full-duplex CSI into a report a base station, in accordance with some aspects of the present disclosure.

DETAILED DESCRIPTION

Figure 1:
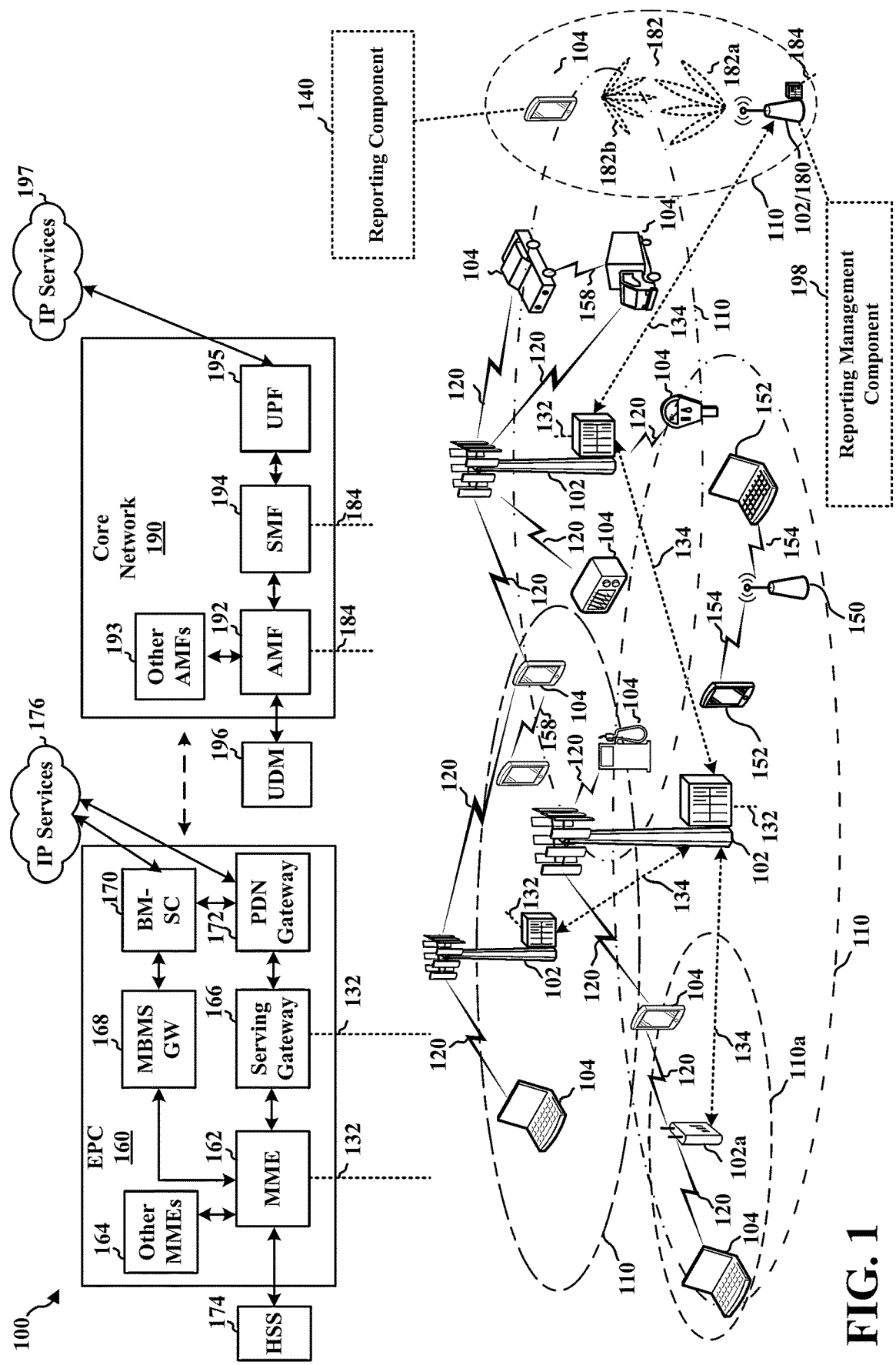
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for configuring a UE to combine half-duplex (HD) and full-duplex (FD) channel state information (CSI) into a single CSI report. As used herein, in some aspects, "full-duplex" communications may refer to transmitting and receiving data at the same time using a single transceiver component. FD communications provide various benefits over HD communications (e.g., increased network capacity). The channel characteristics of downlink transmissions are different for HD communications in comparison to FD communications because of the existence of cross-link interference (CLI) and self-interference. As such, in some aspects, a UE may be configured to report HD CSI and FD CSI to a base station. As described in detail herein, a base station may determine UCI configuration information including one or more parameters for multiplexing half-duplex (HD) channel state information (CSI) and full-duplex (FD) CSI as a combined CSI report, and transmit the UCI configuration information to the UE to cause the UE to generate and transmit a single CSI report having HD CSI and FD CSI. Accordingly, in some aspects, a UE may be configured to reduce overhead, inefficient use of time and frequency resources, and/or power consumption, while improving spectrum efficiency by enabling a base station to configure a UE to provide a combined HD CSI and FD CSI report.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a reporting management component 198 configured to determine parameters 414 for configuring combined half-duplex and full-duplex CSI reporting by UEs 104. Further, in an aspect, a UE 104 may include a reporting component 140 configured to generate combined half-duplex and full duplex CSI reports based on parameters received from a base station 102.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHZ, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology u, there are 14 symbols/slot and 2µ slots/subframe. The subcarrier spacing and symbol length/duration are a function of the numerology. The subcarrier spacing may be equal to 2$^u$*15 kHz, where u is the numerology 0 to 5. As such, the numerology u=0 has a subcarrier spacing of 15 kHz and the numerology u=5 has a subcarrier spacing of 480 kHz. The symbol length/duration is inversely related to the subcarrier spacing. FIGS. 2A-2D provide an example of slot configuration 0 with 14 symbols per slot and numerology u=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
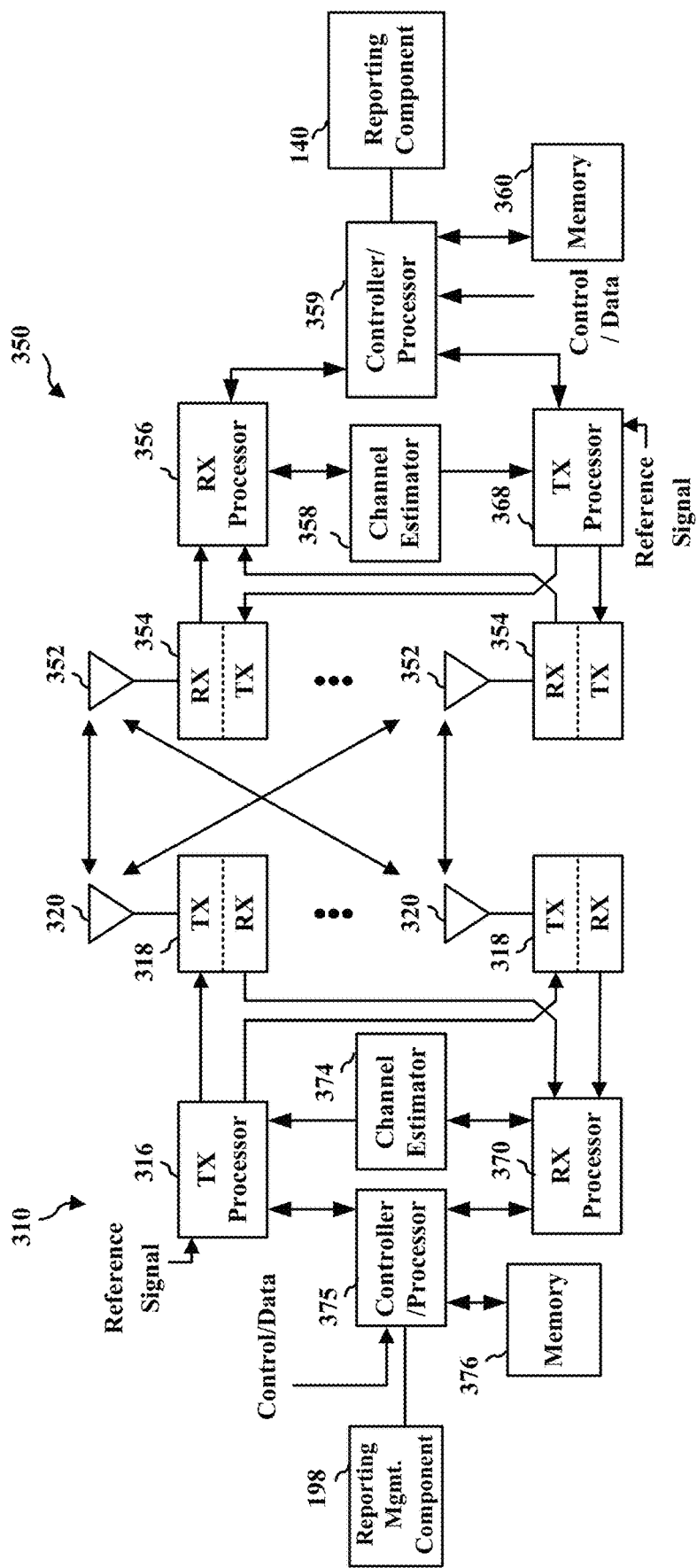
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, and RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the reporting component 140 of FIG. 1.

In the base station 102/180, at least one of the TX processor 316, the RX processor 370, and the controller/processor 375 may be configured to perform aspects in connection with reporting management component 198 of FIG. 1.

In some aspects, a base station and/or a UE may have full duplex capabilities. For example, in some aspects, a base station may transmit a downlink transmission to a UE while contemporaneously receiving an uplink transmission from the UE. As another example, a base station may transmit a downlink transmission to a first UE while contemporaneously receiving an uplink transmission from a second UE. As yet still another example, a UE may transmit a downlink transmission to a first base station while contemporaneously receiving an uplink transmission from a second base station. Further, a full duplex implementation may be an in-band full duplex implementation or a sub-band full duplex implementation. In a first in-band full duplex mode, a transmit operation and a receive operation may occur at the same time over a common frequency band with full overlap between the operations. In a second in-band full duplex mode, a transmit operation and a receive operation may occur may occur at the same time over a common frequency resource in the frequency domain with partial overlap between the operations. Further, in a sub-band duplex mode, a transmit operation and a receive operation may occur at the same but on different frequency resources in the frequency domain. Further, the frequency used for the first operation and the frequency used for the second operation may be separated by a guard band. In addition, in some aspects, the guard band may be of a size that causes partial overlap of the transmit operation and the receive operation due to leakage of the transmit operation. While exhibiting advantages over HD mode via increased throughput or reduced outage probability, gains from FD mode may be eroded by self-interference due to the large power difference between the power imposed by a device's own transmissions and the low-power received signal arriving from a remote transmit antenna. As a means of self-interference mitigation, in some aspects, a UE may utilize two separate panels for simultaneous transmit and receive operations and enforce increased isolation between the two panels. Further, in some sub-band full duplex implementations, the downlink and uplink may be performed in different ports of the band with a guard band between uplink and downlink within the band.

Typically, 5G NR base stations are deployed with a large antenna array, which enables the base stations to apply both beamforming for improving the received signal strength as well as spatial multiplexing for increasing the rank and achievable data rate of the transmission. However, in order to utilize the increased spatial degrees of freedom offered by the arrays, the base station needs CSI for the UEs which it intends to serve. Generally speaking, the CSI is needed for determining the precoding of the ports of the antenna array and setting the link adaptation, i.e. selecting a proper modulation and coding scheme (MCS) of the PDSCH transmission. The CSI reporting configuration can be aperiodic (using a PUSCH), periodic (using a PUCCH), or semi-persistent (using a PUCCH or DCI-activated PUSCH). Typically, a CSI report is comprised of two parts. CSI part 1 has a fixed payload size and is used to identify the number of information bits in CSI part 2. CSI part 1 must be transmitted completely before the transmission of CSI part 2. CSI is transmitted in uplink control information (UCI) messages along with a hybrid automatic repeat request acknowledgment (HARQ-ACK) and a scheduling request (SR). UCI messages are encoded and transmitted through the PUCCH or are multiplexed on the PUSCH. The HARQ-ACK (if any) and CSI (if any) is encoded and multiplexed with or without encoded UL-SCH data, and then transmitted on a PUSCH.

The channel characteristics of a downlink channel may be different in a half-duplex mode and full-duplex mode because of the existence of cross link interference and self-interference. As such, a base station may benefit from knowledge of the channel CSI of both full duplex slots and half-duplex slots. For example, the base station may utilize FD CSI to estimate the impact of different types of interference on a UE in a FD slot. Additionally, the base station may combine the CSI values to decide on one set of transmit parameters (e.g., MCS, rank, etc.) for FD slots and HD slots. In order to reduce CSI feedback overhead at UEs and CSI management overhead at base stations, it may be advantageous for a base station to configure a UE to report combined and/or compressed CSI including HD CSI and FD CSI in the same report. Further, conventional systems have not implemented a cogent process for configuration of systems employing combined HD and FD CSI reports. Specifically, conventional systems lack a means for configuring prioritization and multiplexing of the CSI over the PUSCH or PUCCH. Accordingly, the present techniques enable multiplexing HD CSI and FD CSI as a combined CSI report, thereby minimizing or reducing system overhead, latency, and power consumption, and preserving time and frequency resources.

Referring to FIGS. 4-8, in one non-limiting aspect, a system 400 is configured to facilitate multiplexing HD CSI and FD CSI as a combined CSI report, in accordance with some aspects of the present disclosure.

Figure 4:
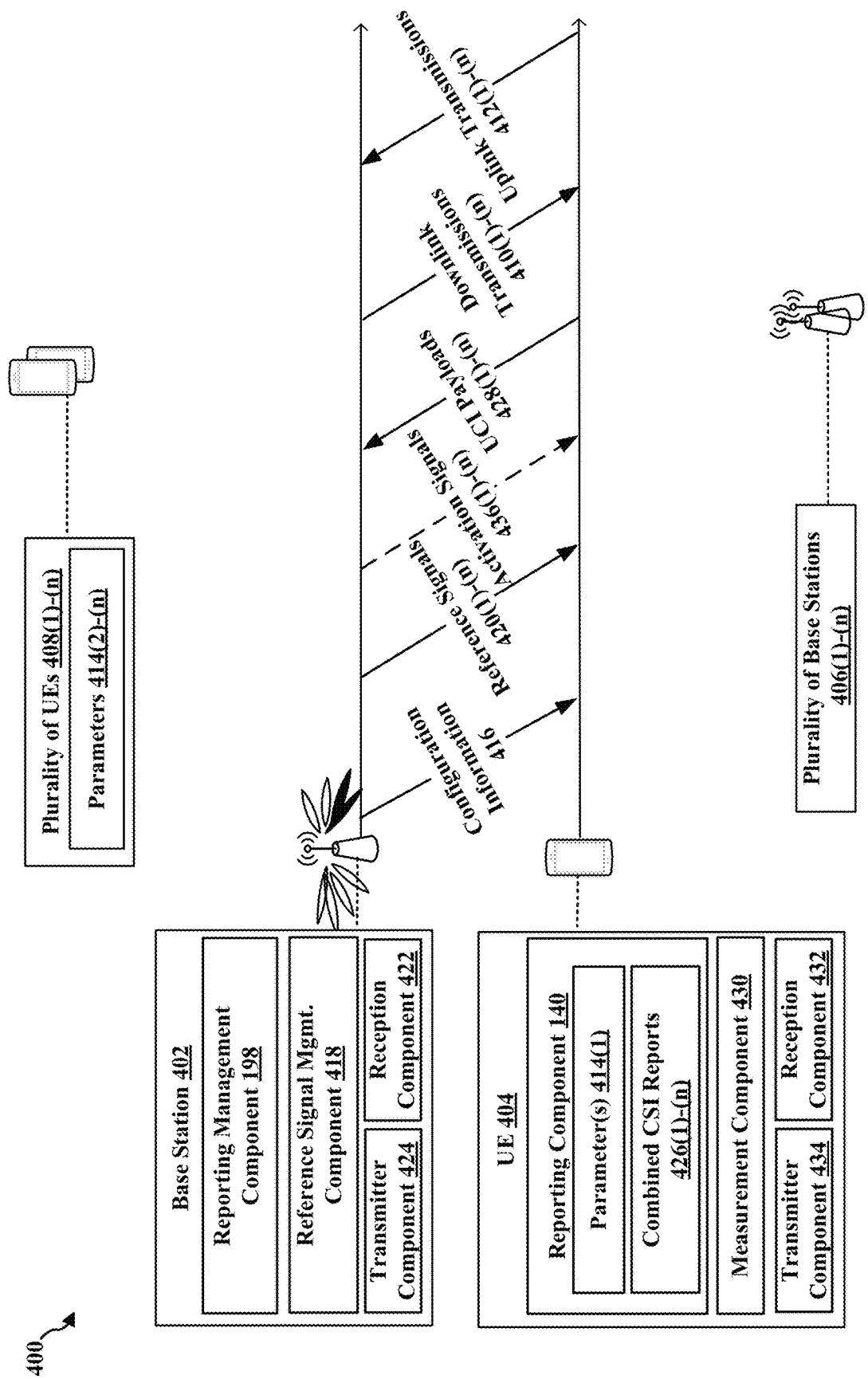
FIG. 4 is a diagram illustrating an example of communications of a base station and a UE, in accordance with some aspects of the present disclosure.

FIG. 4 is a diagram illustrating example communications and components of base stations and UEs. As illustrated in FIG. 4, the system 400 may include a base station 402 (e.g., the base station 102/180) serving a UE 404 (e.g., the UE 104). Further, the system 400 may include a plurality of other base stations 406 and a plurality of other UEs 408 configured to perform similar operations as the base station 402 and the UE 404, respectively. Further, the base station 402 and the UE 404 may be configured for beamformed wireless communications. For example, the base station 402 may exchange downlink transmissions 410(1)-(n) and uplink transmissions 412(1)-(n) with the UE 404 using directional transmit and receive beams, where each beam has an associated beam ID, beam direction, beam symbols, etc. Further, the base station 402 and the UE 404 may perform full duplex communications. For example, the base station 402 may transmit the downlink transmission 410 to the UE 404 while contemporaneously receiving the uplink transmission 412 from the UE 404.

As illustrated in FIG. 4, the base station 402 may include a reporting management component 198 configured to determine one or more parameters 414 for configuring CSI reporting by the UE 404 and the UEs 408, and transmit the one or more parameters 414 to the UE 404 and the UEs 408 within the configuration information 416. For example, as described in detail herein, the reporting management component 198 may determine the one or more parameters 414(1)-(n) for configuring prioritization and multiplexing of the HD CSI and FD CSI on the PUSCH or PUCCH by the UEs 404 and 408, and transmit the configuration information 416 including the one or more parameters 414 to the UE 404. Further, the base station 402 may include a reference signal management component 418 configured to transmit reference signals 420 (e.g., HD reference signals or FD reference signals) to the UEs 404 and 408. In some aspects, the reference signals 420 may be CSI-RSs or SSBs. In addition, the base station 402 may include a reception component 422 and a transmitter component 424. The reception component 422 may include, for example, a radio frequency (RF) receiver for receiving the signals described herein. The transmitter component 424 may include, for example, an RF transmitter for transmitting the signals described herein. In an aspect, the reception component 422 and the transmitter component 424 may be co-located in a transceiver (e.g., the transceiver 510 shown in FIG. 5).

As illustrated in FIG. 4, the UE 404 may include a reporting component 140 configured to report HD CSI and FD CSI in the same report, in accordance with the configuration information 416. For example, the reporting component 140 may be configured to receive the configuration information 416 from the base station 402, prioritize and/or multiplex HD CSI and FD CSI based on the one or more parameters 414 as combined CSI reports 426(1)-(n), and transport the combined CSI reports 426(1)-(n) to the base station 402 in UCI payloads 428(1)-(n). Further, the UE 404 may include a measurement component 430 for measuring the reference signals 420 received from the base stations (e.g., the base station 402 and the base stations 406(1)-(n)) to determine the HD CSI and FD CSI for the combined CSI report 426.

In addition, the UE 404 may include a reception component 432 and a transmitter component 434. The transmitter component 434 may be configured to generate signals for transmission operations as described herein. The transmitter component 434 may include, for example, a RF transmitter for transmitting the signals described herein. The reception component 432 may include, for example, a RF receiver for receiving the signals described herein. In an aspect, the reception component 432 and the transmitter component 434 may be co-located in a transceiver (e.g., the transceiver 610 shown in FIG. 6).

As illustrated in FIG. 4, the base station 402 may transmit the configuration information 416 to the UE 404. Upon receipt of the configuration information 416, the UE 404 may employ the configuration information 416 to configure CSI reporting at the UE 404 by the reporting component 140 via the one or more parameters 414. In some examples, the configuration information 416 may include report type information indicating the scheduling method of the report (e.g., periodic, aperiodic and semi-persistent), report quantity information indicating the attributes to measure (e.g., CSI-related quantities, L1-RSRP-related quantities), report frequency information indicates the reporting granularity in frequency domain (e.g., wideband, sub-band), channel measurement restriction information indicating whether to put the restriction on channel measurement in time domain or not, interference measurement restriction information indicating whether to put the restriction on interference measurement in time domain or not, codebook configuration information indicating the parameters for type 1 and type 2, etc. In some aspects, periodic CSI reports may only be transmitted on the PUCCH as resources for the PUSCH need to be dynamically indicated. In some aspects, semi-persistent CSI reports may be transmitted on the PUCCH or the PUSCH, and activated and deactivated via a MAC-CE command for PUCCH-based CSI reporting and DCI for PUSCH-based CSI reporting. In some aspects, aperiodic CSI reports may only be transmitted on the PUSCH.

Further, as illustrated in FIG. 4, the base station 402 may transmit a first reference signal 420(1) in a HD slot to the UE 404 and a second reference signal 420(2) in a FD slot to the UE 404. Upon receipt of the first reference signal 420(1), the UE 404 may measure the first reference signal 420(1) and determine the HD CSI. Upon receipt of the second reference signal 420(2), the UE 404 may measure the second reference signal 420(2) and determine the FD CSI. In addition, the UE 404 may combine the HD-CSI and FD-CSI into the combined CSI report 426 and multiplex the joint CSI report within the UCI payload 428, in accordance with the multiplexing and/or prioritization rules set forth by the one or more parameters 414.

In some aspects, the reported parameters of the CSI report(s) are encoded in UCI and mapped to PUSCH or PUCCH. Further, the encoding format used may be different depending at least on the physical channel used and the frequency-granularity of the CSI report(s). For example, with respect to PUCCH-based CSI reporting with wideband frequency-granularity, the variation of PMI/CQI payload depending on the selected rank is not too large and therefore a single packet encoding of all CSI parameters in UCI is used. Since the base station 402 may need to know the payload size of the UCI in order to try to decode the transmission, the UCI is padded with a number of dummy bits corresponding to the difference between the maximum UCI payload size and the actual payload size of the CSI report. This ensures that the payload size is fixed irrespective of UE's RI selection. If this measure was not taken, the base station 402 would have to blindly detect the UCI payload size and try to decode for all possible UCI payload sizes, which may not be feasible. However, for PUCCH-based CSI with sub-band frequency-granularity as well as PUSCH-based CSI reporting, always padding the CSI report to the worst-case UCI payload size would result in too large overhead. For these cases, the CSI content is instead divided into two CSI parts, CSI part 1 and CSI part 2, where CSI part 1 has a fixed payload size and CSI part 2 has a variable payload size. In addition, as described in detail herein, the one or more parameters 414 may further configure the UE 404 to divide the CSI content into three CSI parts, i.e., CSI part 1, CSI part 2, and CSI part 3. Further, in some aspects, the information about the payload size of CSI parts 2 and/or 3 may be derived from the CSI parameters in CSI part 1. For example, the base station 402 may decode CSI part 1 to obtain a subset of the CSI parameters. Based on these CSI parameters, the payload size of CSI part 2 can be inferred, and CSI part 2 can be subsequently decoded to obtain the remainder of the CSI parameters. In addition, when a CSI report includes two or three CSI parts, the UE 404 may omit a portion of the CSI parts 2 or 3. As such, in some aspects, CSI parts 2 and 3 may be referred to as excludable parts herein.

Further, in some aspects, two or more CSI report transmissions may collide, in the sense that they are scheduled to be transmitted simultaneously, e.g., a periodic CSI report may collide with an aperiodic CSI report. In some other aspects, a number of CSI reports scheduled to be transmitted simultaneously result in too large a payload size and cannot fit in the UCI container (for instance due to the HARQ-ACK and/or SR that also needs to be multiplexed). For these situations, some CSI reports may have to be dropped or omitted. To know which CSI reports to prioritize in this case, a number of prioritization rules are defined. CSI reports are first prioritized according to their time-domain behavior and physical channel, where more dynamic reports are given precedence over less dynamic reports and PUSCH has precedence over PUCCH. That is, an aperiodic report has priority over a semi-persistent report on PUSCH, which in turn has priority over a semi-persistent report on PUCCH, which has priority over a periodic CSI report. This means that if an aperiodic report is scheduled at the same time where a periodic report is to be transmitted, the periodic report is dropped and not reported. If multiple CSI reports with the same time-domain behavior and physical channel collide, the reports are further prioritized depending on CSI content, where beam reports (i.e., L1-RSRP reporting) has priority over regular CSI reports. The motivation is that the CSI report is typically conditioned on a serving beam, so if the beam is not correct the CSI report is useless anyway. If there is still need for differentiation, the CSI reports are further prioritized based on for which serving cell the CSI corresponds (in case of CA operation). That is, CSI corresponding to the PCell has priority over CSI corresponding to SCells. Finally, in order to avoid any ambiguities in which CSI report is to be transmitted, the CSI reports are prioritized.

In some aspects, a CSI payload will not fit in the container (e.g., a PUSCH container), i.e., the code rate will be too large or even the un-coded systematic bits will not fit. Instead of dropping the entire CSI report in this case, which would be wasteful, NR introduces partial CSI omission, where a portion of the CSI (which can provide some utility to the base station 402 and at least give information about the RI selection so that the base station 402 can allocate a proper PUSCH resource for the next aperiodic CSI request) can still be reported. This is accomplished by ordering the CSI content in CSI part 2 in a particular fashion. If multiple CSI reports are transmitted in the PUSCH, the wideband CSI components (i.e. the wideband PMI and CQI) for all the reports are mapped to the most significant bits of the UCI. Then, the sub-band CSI for each report are mapped according to the previously described priority rules, where the sub-band CSI for even numbered sub-bands are mapped first, followed by sub-band CSI for the odd numbered sub-bands. If the resulting code rate of the UCI is above a threshold, a portion of the least significant UCI bits are omitted, until the code rate falls below the threshold. This means that sub-band CSI for odd numbered sub-bands for a report are omitted first. The motivation is that the base station 402 in this case would have sub-band PMI and CQI for every other sub-band in the frequency domain and can therefore interpolate the PM/CQI between two reported sub-bands to try to estimate the missing PMI/CQI values for the sub-band in the middle. While this will not result in perfect reconstruction, it is better than omitting CSI an entire chunk of consecutive sub-bands.

In some examples, the one or more parameters 414 may configure the reporting component 140 to generate the HD CSI as base information and the FD CSI as differential information capturing the difference between the HD CSI and the FD CSI. Further, in some aspects, the one or more parameters 414 may configure the reporting component 140 to include the differential information in an excludable part of the combined CSI report (e.g., CSI parts 2 and 3 of the combined CSI report 426).

In some aspects, the differential information may be processed similarly to the sub-band CSI, e.g., the differential information may be included CSI part 2 of the combined CSI report 426. For example, the one or more parameters 414 may configure the reporting component 140 to include the base information within the combined CSI report 426 according to at least one of three priority groupings (e.g., groups 0, 1, and 2) and include the differential information within the combined CSI report 426 according to a fourth priority grouping (e.g., group 3 or higher) having a lower level than the three priority groupings. In some aspects, the one or more parameters 414 may configure the reporting component 140 utilize a plurality of priority groupings lower than the three priority groupings (e.g., groups 0, 1, and 2). For example, the one or more parameters 414 may configure the reporting component 140 to include a separate priority grouping for each of the wideband, odd sub-band, and even sub-band. As another example, the one or more parameters 414 may configure the reporting component 140 to include a portion of the base information within the combined CSI report 426 as a first priority grouping (e.g., group 0) and the differential information within the combined CSI report 426 as a second or third priority grouping (e.g., groups 1 and 2) having a lower priority level than the first priority grouping. In some examples, replacing the content of priority groups 1 or 2 with the differential information may be based on RRC configuration of the combined CSI report 426. Further, in some aspects, if the band numbers of the base information are even, then the band numbers of the differential should also be even. Similarly, in some aspects, if the band numbers of the base information are odd, then the band numbers of the differential should also be odd.

In some other aspects, the one or more parameters 414 may configure the reporting component 140 to generate the combined CSI report 426 to include a non-excludable part (i.e., CSI part 1), a first excludable part of a higher priority (i.e., CSI part 2), and a second excludable part (i.e., CSI part 3) of a lower priority that includes the differential information. In addition, the priority reporting levels for CSI part 3 may be similar to the priority reporting levels for CSI part 2.

Further, the one or more parameters 414 may configure the reporting component 140 to multiplex UCI and the combined CSI report 426 on the PUCCH. In some aspects, for PUCCH format 2, if the differential information is included in CSI part 2 or part 3, the differential may be dropped. In some aspects, for PUCCH formats 3 and 4, if the differential information is included in CSI part 2, the baseline information of CSI part 2 and the differential information of CSI part 3 may be jointly encoded. Further, in some aspects, the priority rules may grant a higher priority to the differential information of a report having a higher priority with respect to the base information of a report having lower priority. In some aspects, for PUCCH formats 3 and 4, if the differential information is included in CSI part 3, the baseline information of CSI part 2 and the differential information of CSI part 3 may be separately encoded. Further, in some aspects, the priority rules may grant a lower priority to the differential information of a report having a higher priority with respect to the base information of a report having lower priority. In addition, the reporting component 140 may be configured to drop CSI part 3 before CSI part 2.

In addition, the one or more parameters 414 may configure the reporting component 140 to multiplex UCI and the combined CSI report 426 on PUSCH. In some aspects, the payload of the differential information is included in CSI part 2 or part 3, and the one or more parameters 414 include a beta scaling offset that defines a number of REs used for the excludable part, i.e., CSI part 2 or part 3, of the combined CSI report 426 and the UCI. In some aspects, if the differential information is included in CSI part 2, the one or more parameters 414 may configure the reporting component 140 to determine the number of REs used for the differential information using an existing beta offset parameter for CSI part 2 (e.g., beta_csi_part2). In some other aspects, if the differential information is included in CSI part 2, the one or more parameters 414 may configure the reporting component 140 to determine the number of REs used for the differential information using a new beta scaling offset for CSI part 3. Further, if the beta offset is a semi-static beta offset, the beta offset for the differential information may be configured for CSI part 2 or CSI part 3 via RRC signalling. In addition, if the beta offset is a dynamic beta offset for an aperiodic report trigger via DCI, the last two bits of a DCI received from the base station 402 may indicate the beta offset for the differential information. In some aspects, the last two bits of the DCI may indicate that the same beta offset should be applied to the CSI parts 2 and 3. In some other aspects, the two last two bits of the DCI may indicate that a beta offset for CSI part 2 and a relative beta offset for CDI part 3 may be received via RRC signalling. In yet still some other aspects, the two last two bits of the DCI may indicate that a UE-side data structure may store beta offset values that may be selected for CSI parts 2 and 3.

Further, in some aspects, the one or more parameters 414 may configure the reporting component 140 to map the base information and differential information to the REs in PUSCH. For example, in some aspects, the CSI part 3 including the differential information may be mapped similarly to CSI part 2. For instance, the differential information may be mapped to REs reserved for HARQ-ACK. In some other aspects, the CSI part 3 including the differential information may be mapped according to one or more rules specific to CSI part 3. For instance, the differential information may not be mapped to REs reserved for HARQ-ACK. As such, the differential information will not be punctured during the mapping of HARQ-ACK to the REs in PUSCH.

As illustrated in the UE 404 may transmit the combined CSI report 426 to the base station 402. As described above, the combined CSI report 426 may be multiplexed and prioritized according to the one or more parameters 414. In some examples, the combined CSI report 426 may be transmitted in response to an activation signal 436 (e.g., a DCI for an aperiodic CSI report, or RRC signalling for a semi-periodic CSI report). Upon receipt of the combined CSI report 426, the base station may estimate the impact of different types of interference on UE 404 in a FD slot, combine the two CSI values to decide on one set of transmit parameters for both types of slots, and/or perform scheduling procedures. Further, the base station 402 and UE 404 may exchange downlink transmissions 410 and uplink transmissions 412 in view of the combined CSI report 426.

Figure 5:
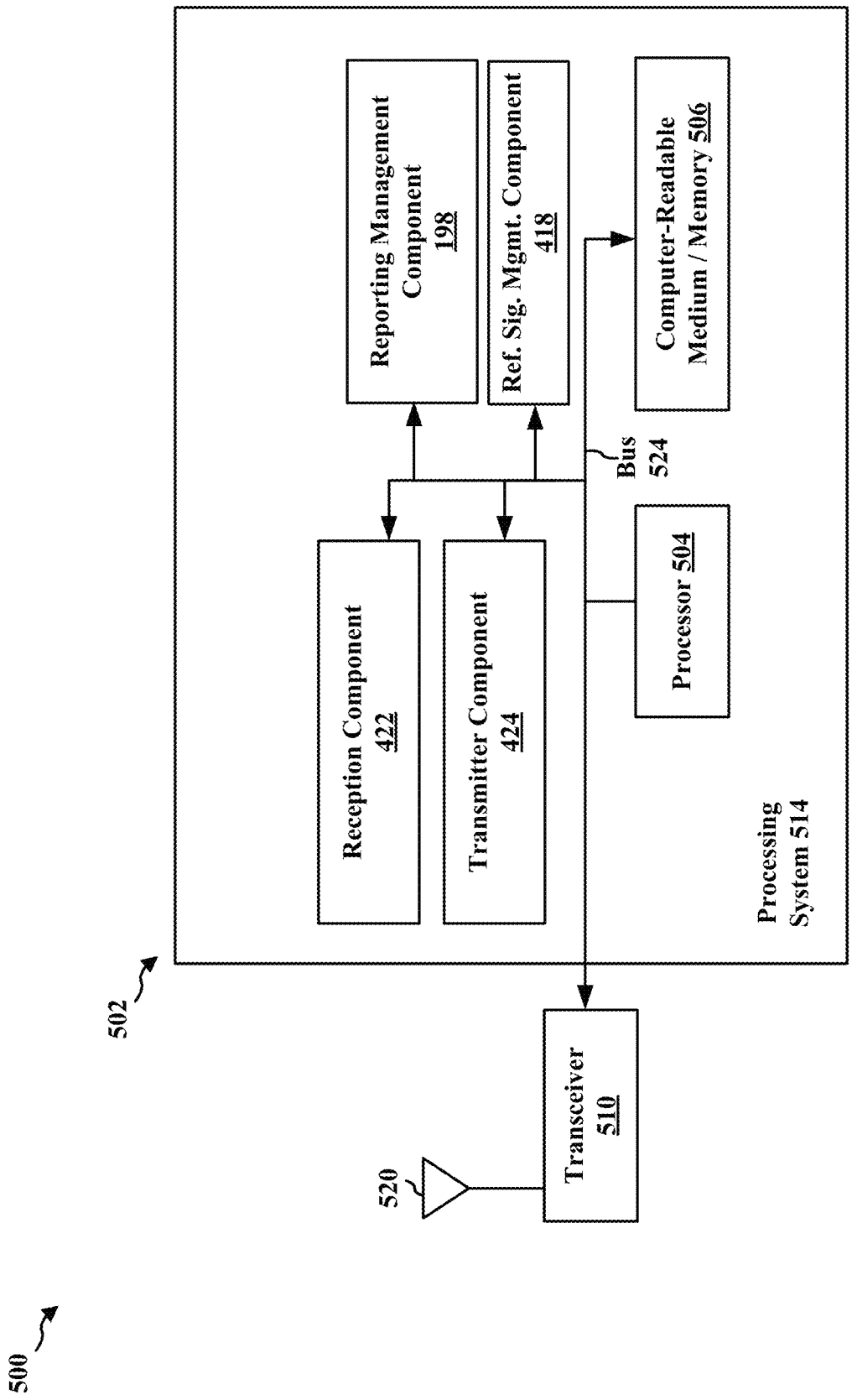
FIG. 5 is a diagram illustrating an example of a hardware implementation for a base station employing a processing system, in accordance with some aspects of the present disclosure.

FIG. 5 is a diagram 500 illustrating an example of a hardware implementation for a base station 502 employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the reporting management component 198, the reference signal management component 418, and the computer-readable medium/memory 506. The bus 524 may also link various other circuits such as timing sources, peripherals, voltage regulators, and power management circuits, which are well known in the art, and therefore, will not be described any further.

The processing system 514 may be coupled with a transceiver 510. The transceiver 510 is coupled with one or more antennas 520. The transceiver 510 provides a means for communicating with various other apparatus over a transmission medium. The transceiver 510 receives a signal from the one or more antennas 520, extracts information from the received signal, and provides the extracted information to the processing system 514, specifically the reception component 422. The reception component 422 may receive the uplink transmissions 412 and the combined CSI report 426. In addition, the transceiver 510 receives information from the processing system 514, specifically the transmitter component 424, and based on the received information, generates a signal to be applied to the one or more antennas 520. Further, the transmitter component 424 may send the downlink transmissions 410, the configuration information 416, the reference signals 420, and the activation signals 436(1)-(n).

The processing system 514 includes a processor 504 coupled with a computer-readable medium/memory 506 (e.g., a non-transitory computer readable medium). The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system 514 further includes at least one of the reporting management component 198, or the reference signal management component 418. The aforementioned components may be software components running in the processor 504, resident/stored in the computer readable medium/memory 506, one or more hardware components coupled with the processor 504, or some combination thereof. The processing system 514 may be a component of the base station 310 and may include the memory 376 and/or at least one of the TX processor 316, the RX processor 370, and the controller/processor 375. Alternatively, the processing system 514 may be the entire base station (e.g., see 310 of FIG. 3, base station 402 of FIG. 4).

The reporting management component 198 may be configured to configure the combining and multiplexing of HD CSI and FD CSI by a UE 404. Further, the reference signal management component 418 may be configured to transmit first reference signals 420 for determining HD CSI by the UE 404 and second reference signals 420 for determining FD CSI by the UE 404.

The aforementioned means may be one or more of the aforementioned components of the base station 502 and/or the processing system 514 of the base station 502 configured to perform the functions recited by the aforementioned means. As described supra, the processing system 514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 6:
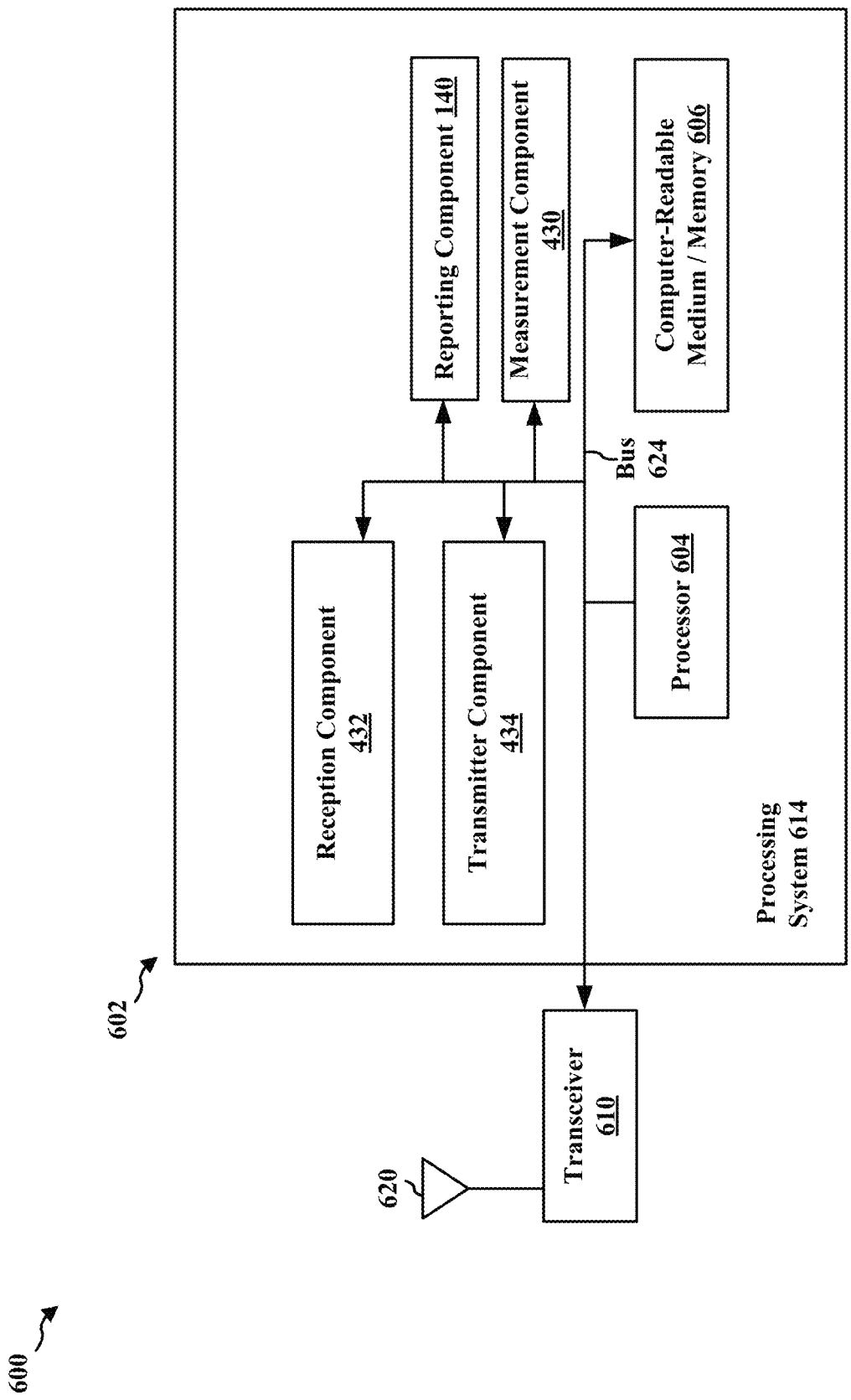
FIG. 6 is a diagram illustrating an example of a hardware implementation for a UE employing a processing system, in accordance with some aspects of the present disclosure.

FIG. 6 is a diagram 600 illustrating an example of a hardware implementation for a UE 602 (e.g., the UE 104, the UE 404, etc.) employing a processing system 614. The processing system 614 may be implemented with a bus architecture, represented generally by the bus 624. The bus 624 may include any number of interconnecting buses and/or bridges depending on the specific application of the processing system 614 and the overall design constraints. The bus 624 links together various circuits including one or more processors and/or hardware components, represented by the processor 604, the reporting component 140, measurement component 430, and the computer-readable medium (e.g., non-transitory computer-readable medium)/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 may be coupled with one or more antennas 620. The transceiver 610 provides a means for communicating with various other apparatus over a transmission medium. The transceiver 610 receives a signal from the one or more antennas, extracts information from the received signal, and provides the extracted information to the processing system 614, specifically the reception component 432. The reception component 432 may receive the downlink transmissions 410, the configuration information 416, the reference signals 420, and the activation signals 436(1)-(n). In addition, the transceiver 610 receives information from the processing system 614, specifically the transmitter component 434, and based on the received information, generates a signal to be applied to the one or more antennas. Further, the transmitter component 434 may transmit the combined CSI report 426 and the uplink transmissions 412.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the reporting component 140, or the measurement component 430. The aforementioned components may be a software component running in the processor 604, resident/stored in the computer readable medium/memory 606, one or more hardware components coupled with the processor 604, or some combination thereof. The processing system 614 may be a component of the UE 602 and may include the memory 360 and/or at least one of the TX processor 368, the RX processor 356, and the controller/processor 359. Alternatively, the processing system 614 may be the entire UE (e.g., see 350 of FIG. 3, UE 404 of FIG. 4).

The reporting component 140 may be configured to generate and transmit the combined CSI report 426 in accordance with the one or more parameters 414. Further, the measurement component 430 may be configured to measure the reference signals 420(1)-(n) received from a base station (e.g., the base station 402).

The aforementioned means may be one or more of the aforementioned components of the UE 602 and/or the processing system 614 of UE 602 configured to perform the functions recited by the aforementioned means. As described supra, the processing system 614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 7 is a flowchart of a method 700 of implementing a procedure for combining HD and FD CSI into a report on the PUCCH and the PUSCH transmissions, in accordance with some aspects of the present disclosure. The method may be performed by a base station (e.g., the base station 102, which may include the memory 376 and which may be the entire base station or a component of the base station, such as reporting management component 198, reference signal management component 418, the TX processor 316, the RX processor 370, and/or the controller/processor 375; the base station 402, the base station 502 of FIG. 5).

At block 710, the method 700 may include generating uplink control information (UCI) configuration information for a user equipment, the UCI configuration information including one or more parameters for configuring a UE to multiplex half-duplex (HD) channel state information (CSI) and full-duplex (FD) CSI as a combined CSI report. For example, the reporting management component 198 may determine the one or more parameters 414 for configuring prioritization and multiplexing of the HD CSI and FD CSI on the PUSCH or PUCCH by the UE 404.

Accordingly, the base station 102, the TX processor 316, the RX processor 370, and/or the controller/processor 375 executing the reporting management component 198 may provide means for generating uplink control information (UCI) configuration information for a user equipment, the UCI configuration information including one or more parameters for configuring a UE to multiplex half-duplex (HD) channel state information (CSI) and full-duplex (FD) CSI as a combined CSI report.

At block 720, the method 700 may include transmitting the UCI configuration to the UE. For example, the reporting management component 198 may transmit the configuration information 416 including the one or more parameters 414 to the UE 404.

Accordingly, the base station 102, the RX processor 370, and/or the controller/processor 375 executing the reporting management component 198 may provide means for transmitting the UCI configuration to the UE.

At block 730, the method 700 may include transmitting, to the UE, a first reference signal associated with a HD mode and a second reference signal associated with a FD mode. For example, the reference signal management component 418 may transmit the first reference signal 420(1) in a HD slot to the UE 404 and the second reference signal 420(2) in a FD slot to the UE 404

Accordingly, the base station 102, the RX processor 370, and/or the controller/processor 375 executing the reporting management component 198 may provide means for transmitting, to the UE, a first reference signal associated with a HD mode and a second reference signal associated with a FD mode.

At block 740, the method 700 may include receiving, from the UE, the combined CSI report based on the one or more parameters, the first reference signal, and the second reference signal. For example, the base station 402 may receive the combined CSI report 426 from the UE 404.

Accordingly, the base station 102, the RX processor 370, and/or the controller/processor 375 executing the reporting management component 198 may provide means for receiving, from the UE, the combined CSI report based on the one or more parameters, the first reference signal, and the second reference signal.

Figure 8:
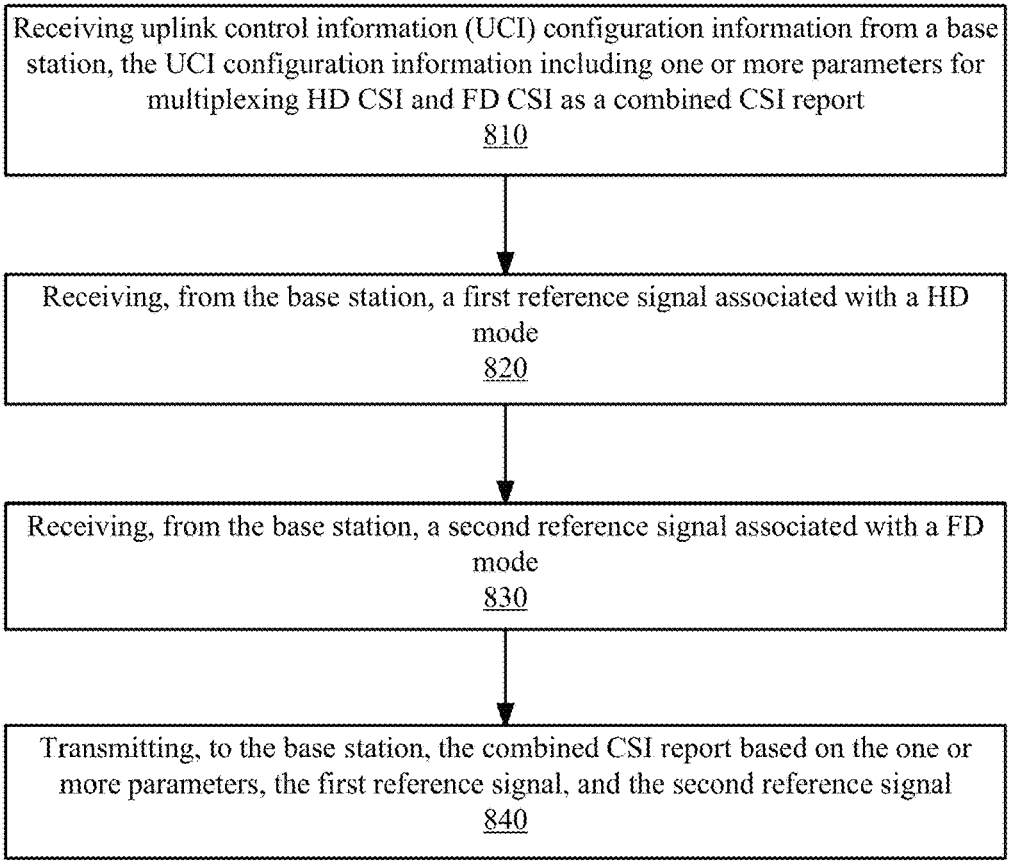
FIG. 8 is a flowchart of an example method of implementing a procedure for combining half-duplex and full-duplex CSI into a report at a UE, in accordance with some aspects of the present disclosure.

FIG. 8 is a flowchart of a method 800 of implementing a procedure for combining HD and FD CSI into a report on the PUCCH and the PUSCH transmissions. The method may be performed by a UE (e.g., the UE 104 of FIGS. 1 and 3, which may include the memory 360 and which may be the entire UE 104 or a component of the UE 104, such as the reporting component 140, the measurement component 430, the TX processor 368, the RX processor 356, and/or the controller/processor 359; the UE 404 of FIG. 4; and/or the UE 602 of FIG. 6).

At block 810, the method 800 may include receiving uplink control information (UCI) configuration information from a base station, the UCI configuration information including one or more parameters for multiplexing HD CSI and FD CSI as a combined CSI report. For example, the UE 404 may receive the configuration information 416 including the one or more parameters 414 from the base station 402.

Accordingly, the UE 104, the UE 404, UE 902, the TX processor 368, the RX processor 356, and/or the controller/processor 359, executing the reporting component 140 may provide means for receiving UCI configuration information from a base station, the UCI configuration information including one or more parameters for multiplexing HD CSI and FD CSI as a combined CSI report.

At block 820, the method 800 may include receiving, from the base station, a first reference signal associated with a HD mode. For example, the UE 404 may receive the first reference signal 420(1), measure the first reference signal 420(1), and determine the HD CSI.

Accordingly, the UE 104, the UE 404, UE 902, the TX processor 368, the RX processor 356, and/or the controller/processor 359 executing the measurement component 430 may provide means for receiving, from the base station, a first reference signal associated with a HD mode.

At block 830, the method 800 may include receiving, from the base station, a second reference signal associated with a FD mode. For example, the UE 404 may receive the second reference signal 420(2), measure the second reference signal 420(2), and determine the FD CSI.

Accordingly, the UE 104, the UE 404, UE 902, the TX processor 368, the RX processor 356, and/or the controller/processor 359 executing the measurement component 430 may provide means for receiving, from the base station, a second reference signal associated with a FD mode.

At block 840, the method 800 may include transmitting, to the base station, the combined CSI report based on the one or more parameters, the first reference signal, and the second reference signal. For example the UE 404 may combine the HD-CSI and FD-CSI into the combined CSI report 426 and multiplex the combined CSI report 426 with UCI, in accordance with the multiplexing and/or prioritization rules set forth by the one or more parameters 414. Further, the UE 404 may transmit the UCI/CSI report 426 on the PUCCH or the PUSCH.

Accordingly, the UE 104, the UE 404, UE 902, the TX processor 368, the RX processor 356, and/or the controller/processor 359 executing the reporting component 140 may provide means for transmitting, to the base station, the combined CSI report based on the one or more parameters, the first reference signal, and the second reference signal.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a UE, comprising receiving uplink control information (UCI) configuration information from a base station, the UCI configuration information including one or more parameters for multiplexing half-duplex (HD) channel state information (CSI) and full-duplex (FD) CSI as a combined CSI report; receiving, from the base station, a first reference signal associated with a HD mode; receiving, from the base station, a second reference signal associated with a FD mode; and transmitting, to the base station, the combined CSI report based on the one or more parameters, the first reference signal, and the second reference signal.

B. The method as paragraph A recites, wherein transmitting the combined CSI report comprises determining base information based on measuring the first reference signal; and determining differential information based on the base information and measuring the second reference signal, wherein the differential information is included in an excludable part of the combined CSI report.

C. The method as paragraph B recites, wherein the base information is reported within the combined CSI report according to at least one of three priority groupings and the differential information is reported within the combined CSI report according to a fourth priority grouping having a lower priority level than the three priority groupings.

D. The method as paragraph B recites, wherein a portion of the base information is reported within the combined CSI report as a first priority grouping and the differential information is reported within the combined CSI report according to a second or third priority grouping having a lower priority level than the first priority grouping.

E. The method as paragraph B recites, wherein transmitting the combined CSI report comprises transmitting, via format two of a physical uplink control channel, a non-excludable part of the combined CSI report while omitting transmission of the excludable part of the combined CSI report.

F. The method as paragraph B recites, wherein transmitting the combined CSI report comprises transmitting the combined CSI report via format three or format four of a physical uplink control channel, wherein the base information and the differential information are jointly encoded within the excludable part of the combined CSI report.

G. The method as paragraph B recites, wherein the one or more parameters include a beta scaling offset that defines a number of resource elements used for the excludable part of the combined CSI report.

H. The method as any of paragraphs A-G recite, wherein transmitting the combined CSI report, comprises determining base information based on measuring the first reference signal; and determining differential information based on the base information and measuring the second reference signal, wherein the combined CSI report includes a non-excludable part, a first excludable part of a higher priority, and a second excludable part of a lower priority that includes the differential information.

I. The method as paragraph H recites, wherein transmitting the combined CSI report comprises transmitting, via format two of a physical uplink control channel, the non-excludable part of the combined CSI report while omitting transmission of the second excludable part of the combined CSI report.

J. The method as paragraph H recites, wherein transmitting the combined CSI report comprises transmitting the combined CSI report via format three or format four of a physical uplink control channel, wherein the base information and the differential information are separately encoded within the combined CSI report.

K. The method as paragraph H recites, wherein the one or more parameters include a beta scaling offset that defines a number of resource elements in a physical uplink shared channel used for the second excludable part of the combined CSI report.

L. The method as any of paragraphs A-G recite, further comprising receiving, from the base station, a radio resource control signal indicating a semi-static beta offset that defines a number of resource elements in a physical uplink shared channel used for the combined CSI report.

M. The method as any of paragraphs A-G recite, further comprising receiving, from the base station, downlink control information including two bits indicating a dynamic beta scaling offset that defines a number of resource elements in a physical uplink shared channel used for the combined CSI report.

N. The method as paragraph H recites, wherein transmitting the combined CSI report comprises mapping the second excludable part to one or more resource elements reserved for a hybrid automatic repeat request (HARQ) acknowledgment; and replacing a portion of the differential information with the HARQ acknowledgement.

O. The method as paragraph H recites, wherein transmitting the combined CSI report comprises mapping the second excludable part to one or more resource elements that are not reserved for a hybrid automatic repeat request (HARQ) acknowledgment.

P. A UE for wireless communication, comprising a memory storing computer-executable instructions; and at least one processor coupled with the memory and configured to execute the computer-executable instructions to perform the method of any of paragraphs A-O.

Q. A UE for wireless communication, comprising means for performing the method of any of paragraphs A-O.

R. A non-transitory computer-readable medium storing computer executable code, the code when executed by a processor causes the processor to perform the method of any of paragraphs A-O.

S. A method of wireless communication at a base station, comprising generating uplink control information (UCI) configuration information for a user equipment, the UCI configuration information including one or more parameters for configuring a UE to multiplex half-duplex (HD) channel state information (CSI) and full-duplex (FD) CSI as a combined CSI report; transmitting the UCI configuration to the UE; transmitting, to the UE, a first reference signal associated with a HD mode and a second reference signal associated with a FD mode; and receiving, from the UE, the combined CSI report based on the one or more parameters, the first reference signal, and the second reference signal.

T. The method as paragraph S recites, wherein the one or more parameters configure the UE to generate the combined CSI report to include base information based on UE measurement of the first reference signal, differential information based on the base information and UE measurement of the second reference signal, and wherein the differential information is included in an excludable part of the combined CSI report.

U. The method as paragraph T recites, wherein the one or more parameters configure the UE to report the base information within the combined CSI report according to at least one of three priority groupings and report the differential information within the combined CSI report according to a fourth priority grouping having a lower level than the three priority groupings.

V. The method as paragraph T recites, wherein the one or more parameters configure the UE to report a portion of the base information within the combined CSI report as a first priority grouping and the differential information within the combined CSI report as a second or third priority grouping having a lower priority level than the first priority grouping.

W. The method as paragraph T recites, wherein the one or more parameters configure the UE to transmit, via format two of a physical uplink control channel, a non-excludable part of the combined CSI report while omitting transmission of the excludable part of the combined CSI report.

X. The method as paragraph T recites, wherein the one or more parameters configure the UE to transmit the combined CSI report via format three or format four of a physical uplink control channel, and wherein the base information and the differential information are jointly encoded within the excludable part of the combined CSI report.

Y. The method as paragraph S recites, wherein the one or more parameters configure the UE to generate base information based on UE measurement of the first reference signal, differential information based on the base information and UE measurement of the second reference signal, and the combined CSI report to include a non-excludable part that includes at least a portion of the base information, a first excludable part of a higher priority, and a second excludable part of a lower priority that includes the differential information.

Z. The method as paragraph Y recites, wherein the one or more parameters configure the UE to transmit, via format two of a physical uplink control channel, the non-excludable part of the combined CSI report while omitting transmission of the second excludable part of the combined CSI report.

AA. The method as paragraph Y recites, wherein the one or more parameters configure the UE to transmit the combined CSI report via format three or format four of a physical uplink control channel, and wherein the base information and the differential information are separately encoded the combined CSI report.

AB. The method as any of paragraphs S-AA recite, further comprising transmitting, to the UE, a radio resource control signal indicating a semi-static beta offset that defines a number of resource elements in a physical uplink shared channel used for the combined CSI report.

AC. The method as any of paragraphs S-AA recite, further comprising transmitting, to the UE, downlink control information including two bits indicating a dynamic beta scaling offset that defines a number of resource elements in a physical uplink shared channel used for the combined CSI report.

AD. The method as paragraph Y recites, wherein the one or more parameters configure the UE to map the second excludable part to one or more resource elements reserved for a hybrid automatic repeat request (HARQ) acknowledgment.

AE. The method as paragraph Y recites, wherein the one or more parameters configure the UE to map the second excludable part to one or more resource elements reserved for a hybrid automatic repeat request (HARQ) acknowledgment.

AF. A base station for wireless communication, comprising a memory storing computer-executable instructions; and at least one processor coupled with the memory and configured to execute the computer-executable instructions to perform the method of any of paragraphs S-AE.

AG. A base station for wireless communication, comprising means for performing the method of any of paragraphs S-AE.

AH. A non-transitory computer-readable medium storing computer executable code, the code when executed by a processor causes the processor to perform the method of any of paragraphs S-AE.

What is claimed is:

1. A user equipment (UE) for wireless communication, comprising:
  a memory storing computer-executable instructions; and
  at least one processor coupled with the memory and configured to execute the computer-executable instructions to:

receive uplink control information (UCI) configuration information from a base station, the UCI configuration information including one or more parameters for multiplexing half-duplex (HD) channel state information (CSI) and full-duplex (FD) CSI as a combined CSI report;

receive, from the base station, a first reference signal associated with a HD mode;

receive, from the base station, a second reference signal associated with a FD mode;

determine base information based on measuring the first reference signal;

determine differential information based on the base information and measuring the second reference signal; and transmit, to the base station, the combined CSI report based on the one or more parameters, the first reference signal, and the second reference signal, wherein the differential information is included in an excludable part of the combined CSI report.

2. The UE of claim 1, wherein the base information is reported within the combined CSI report according to at least one of three priority groupings and the differential information is reported within the combined CSI report according to a fourth priority grouping having a lower priority level than the three priority groupings.

3. The UE of claim 1, wherein a portion of the base information is reported within the combined CSI report as a first priority grouping and the differential information is reported within the combined CSI report according to a second or third priority grouping having a lower priority level than the first priority grouping.

4. The UE of claim 1, wherein to transmit the combined CSI report, the at least one processor is further configured to:

transmit, via format two of a physical uplink control channel, a non-excludable part of the combined CSI report while omitting transmission of the excludable part of the combined CSI report.

5. The UE of claim 1, wherein to transmit the combined CSI report, the at least one processor is further configured to:

transmit the combined CSI report via format three or format four of a physical uplink control channel, wherein the base information and the differential information are jointly encoded within the excludable part of the combined CSI report.

6. The UE of claim 1, wherein the one or more parameters include a beta scaling offset that defines a number of resource elements used for the excludable part of the combined CSI report.

7. The UE of claim 1, wherein the combined CSI report includes a non-excludable part and the excludable part, the excludable part comprises a first excludable part of a higher priority and a second excludable part of a lower priority and the differential information is included in the first excludable part or the second excludable part.

8. The UE of claim 7, wherein to transmit the combined CSI report, the at least one processor is further configured to:

transmit, via format two of a physical uplink control channel, the non-excludable part of the combined CSI report while omitting transmission of the second excludable part of the combined CSI report.

9. The UE of claim 7, wherein to transmit the combined CSI report, the at least one processor is further configured to:

transmit the combined CSI report via format three or format four of a physical uplink control channel, wherein the base information and the differential information are separately encoded within the combined CSI report.

10. The UE of claim 7, wherein the one or more parameters include a beta scaling offset that defines a number of resource elements in a physical uplink shared channel used for the second excludable part of the combined CSI report.

11. The UE of claim 7, wherein to transmit the combined CSI report, the at least one processor is further configured to:

map the second excludable part to one or more resource elements reserved for a hybrid automatic repeat request (HARQ) acknowledgment; and replace a portion of the differential information with the HARQ acknowledgement.

12. The UE of claim 7, wherein to transmit the combined CSI report, the at least one processor is further configured to:

map the second excludable part to one or more resource elements that are not reserved for a hybrid automatic repeat request (HARQ) acknowledgment.

13. The UE of claim 1, wherein the at least one processor is further configured to:

receive, from the base station, a radio resource control signal indicating a semi-static beta offset that defines a number of resource elements in a physical uplink shared channel used for the combined CSI report.

14. The UE of claim 1, wherein the at least one processor is further configured to:

receive, from the base station, downlink control information including two bits indicating a dynamic beta scaling offset that defines a number of resource elements in a physical uplink shared channel used for the combined CSI report.

15. A method of wireless communication at a UE, comprising:

receiving uplink control information (UCI) configuration information from a base station, the UCI configuration information including one or more parameters for multiplexing half-duplex (HD) channel state information (CSI) and full-duplex (FD) CSI as a combined CSI report;

receiving, from the base station, a first reference signal associated with a HD mode;

receiving, from the base station, a second reference signal associated with a FD mode;

determining base information based on measuring the first reference signal;

determining differential information based on the base information and measuring the second reference signal; and transmitting, to the base station, the combined CSI report based on the one or more parameters, the first reference signal, and the second reference signal, wherein the differential information is included in an excludable part of the combined CSI report.

16. The method of claim 15, wherein the combined CSI report includes a non-excludable part and the excludable part, the excludable part comprises a first excludable part of a higher priority and a second excludable part of a lower priority with the differential information included in the first excludable part or the second excludable part.

17. A base station for wireless communication, comprising:

a memory storing computer-executable instructions; and at least one processor coupled with the memory and configured to execute the computer-executable instructions to:

generate uplink control information (UCI) configuration information for a user equipment, the UCI configuration information including one or more parameters for configuring a UE to multiplex half-duplex (HD) channel state information (CSI) and full-duplex (FD) CSI as a combined CSI report;

transmit the UCI configuration information to the UE;

transmit, to the UE, a first reference signal associated with a HD mode and a second reference signal associated with a FD mode; and receive, from the UE, the combined CSI report based on the one or more parameters, the first reference signal, and the second reference signal, wherein the one or more parameters configure the UE to generate the combined CSI report to include base information based on UE measurement of the first reference signal, differential information based on the base information and UE measurement of the second reference signal, and wherein the differential information is included in an excludable part of the combined CSI report.

18. The base station of claim 17, wherein the one or more parameters configure the UE to report the base information within the combined CSI report according to at least one of three priority groupings and report the differential information within the combined CSI report according to a fourth priority grouping having a lower level than the three priority groupings.

19. The base station of claim 17, wherein the one or more parameters configure the UE to report a portion of the base information within the combined CSI report as a first priority grouping and the differential information within the combined CSI report as a second or third priority grouping having a lower priority level than the first priority grouping.

20. The base station of claim 17, wherein the one or more parameters configure the UE to transmit, via format two of a physical uplink control channel, a non-excludable part of the combined CSI report while omitting transmission of the excludable part of the combined CSI report.

21. The base station of claim 17, wherein the one or more parameters configure the UE to transmit the combined CSI report via format three or format four of a physical uplink control channel, and wherein the base information and the differential information are jointly encoded within the excludable part of the combined CSI report.

22. The base station of claim 17, wherein the one or more parameters configure the UE to generate the combined CSI report to include a non-excludable part that includes at least a portion of the base information and the excludable part, the excludable part comprises a first excludable part of a higher priority and a second excludable part of a lower priority with the differential information included in the first executable part or the second excludable part.

23. The base station of claim 22, wherein the one or more parameters configure the UE to transmit, via format two of a physical uplink control channel, the non-excludable part of the combined CSI report while omitting transmission of the second excludable part of the combined CSI report.

24. The base station of claim 22, wherein the one or more parameters configure the UE to transmit the combined CSI report via format three or format four of a physical uplink control channel, and wherein the base information and the differential information are separately encoded the combined CSI report.

25. The base station of claim 22, wherein the one or more parameters configure the UE to map the second excludable part to one or more resource elements reserved for a hybrid automatic repeat request (HARQ) acknowledgment.

26. The base station of claim 22, wherein the one or more parameters configure the UE to map the second excludable part to one or more resource elements reserved for a hybrid automatic repeat request (HARQ) acknowledgment.

27. The base station of claim 17, wherein the at least one processor is further configured to transmit, to the UE, a radio resource control signal indicating a semi-static beta offset that defines a number of resource elements in a physical uplink shared channel used for the combined CSI report.

28. The base station of claim 17, wherein the at least one processor is further configured to:

transmit, to the UE, downlink control information including two bits indicating a dynamic beta scaling offset that defines a number of resource elements in a physical uplink shared channel used for the combined CSI report.

29. A method of wireless communication at a base station, comprising:

generating uplink control information (UCI) configuration information for a user equipment, the UCI configuration information including one or more parameters for configuring a UE to multiplex half-duplex (HD) channel state information (CSI) and full-duplex (FD) CSI as a combined CSI report;

transmitting the UCI configuration information to the UE;

transmitting, to the UE, a first reference signal associated with a HD mode and a second reference signal associated with a FD mode; and receiving, from the UE, the combined CSI report based on the one or more parameters, the first reference signal, and the second reference signal, wherein the one or more parameters configure the UE to generate the combined CSI report to include base information based on UE measurement of the first reference signal, differential information based on the base information and UE measurement of the second reference signal, and wherein the differential information is included in an excludable part of the combined CSI report.

30. The method of claim 29, wherein the combined CSI report includes a non-excludable part and the excludable part, the excludable part comprises a first excludable part of a higher priority and a second excludable part of a lower priority with the differential information included in the first excludable part or the second excludable part.

* * * * *